United States Patent
Maeda et al.

(10) Patent No.: US 8,123,359 B2
(45) Date of Patent: Feb. 28, 2012

(54) ILLUMINATION APPARATUS AND PROJECTION DISPLAY APPARATUS

(75) Inventors: Makoto Maeda, Osaka (JP); Masutaka Inoue, Hirakata (JP); Takaaiki Abe, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 331 days.

(21) Appl. No.: 12/171,420

(22) Filed: Jul. 11, 2008

(65) Prior Publication Data
US 2009/0015796 A1 Jan. 15, 2009

(30) Foreign Application Priority Data

Jul. 13, 2007 (JP) ................................ 2007-184791
Jun. 24, 2008 (JP) ................................ 2008-165085

(51) Int. Cl.
*G03B 21/14* (2006.01)
(52) U.S. Cl. ........................................................ 353/20
(58) Field of Classification Search .................... 353/20, 353/37, 98; 362/296, 298; 359/486.01; 349/96, 349/99
See application file for complete search history.

(56) References Cited

U.S. PATENT DOCUMENTS

| | | | | |
|---|---|---|---|---|
| 3,342,539 A | * | 9/1967 | Nelson et al. | 359/250 |
| 7,288,899 B2 | * | 10/2007 | Akiyama | 315/291 |
| 2006/0119797 A1 | * | 6/2006 | Ockenfuss | 353/31 |
| 2008/0100804 A1 | * | 5/2008 | Kanayama et al. | 353/20 |

FOREIGN PATENT DOCUMENTS

JP  2000-137289 A  5/2000

* cited by examiner

*Primary Examiner* — Georgia Y Epps
*Assistant Examiner* — Don Williams
(74) *Attorney, Agent, or Firm* — Marvin A. Motsenbocker; Mots Law, PLLC

(57) ABSTRACT

The illumination apparatus includes a color separator configured to separate a white light beam, emitted from a white light source, into a plurality of color component light beams, a plurality of imagers each configured to modulate a corresponding one of the plurality of color component light beams separated by the color separator and a polarization modulator provided on a light incident side of one imager included in the plurality of imagers. The polarization modulator modulates a polarization direction of a modulation-object light beam which is part of a color component light beam guided to the one imager.

14 Claims, 10 Drawing Sheets

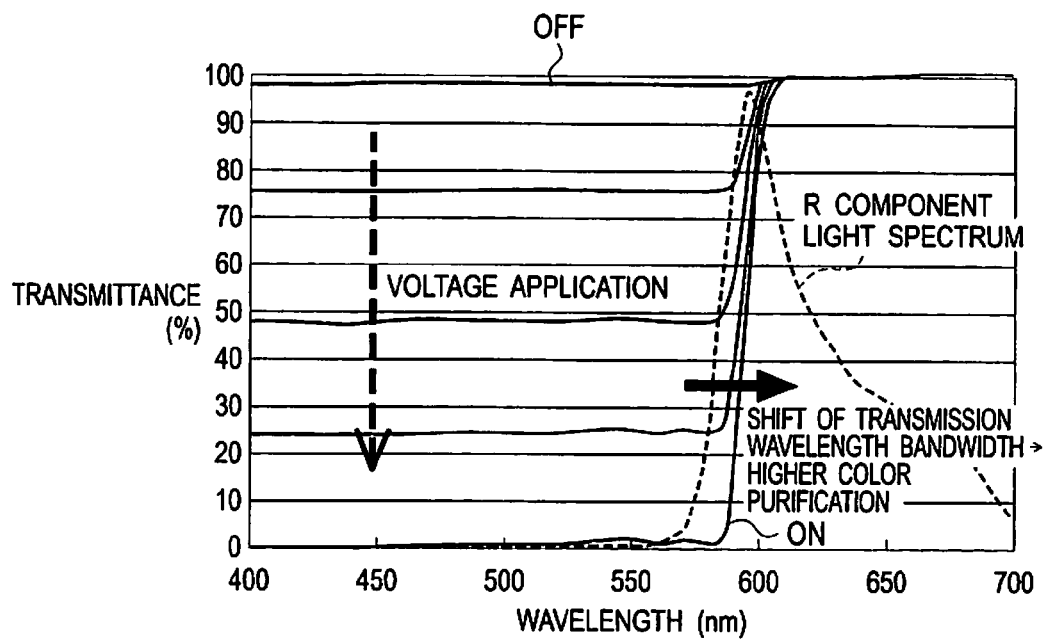
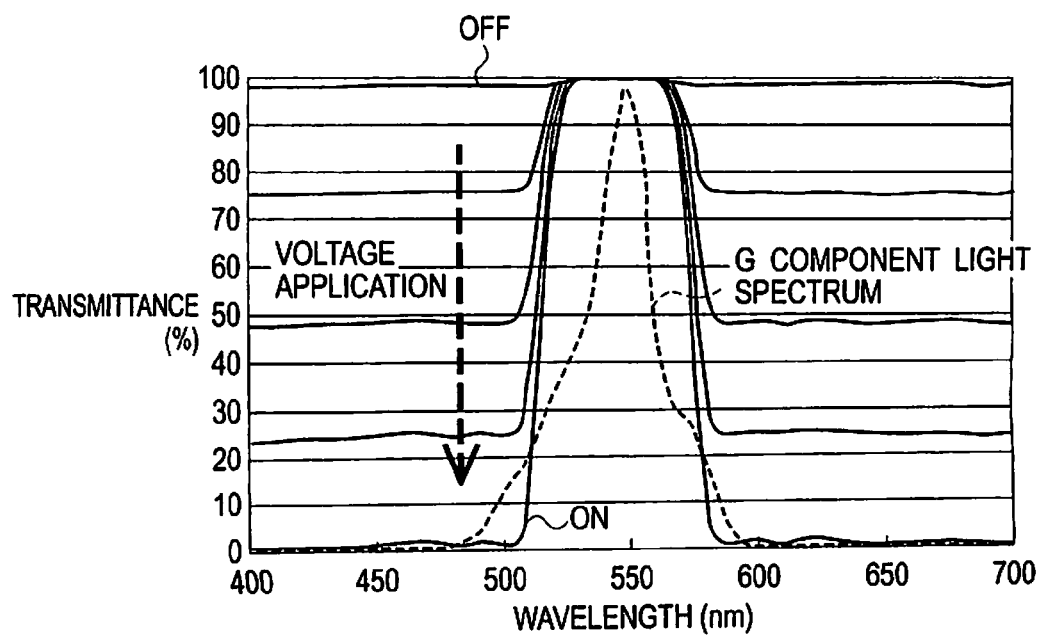

ated Art

A projection display apparatus currently known includes: a color separator configured to separate a white light beam, emitted from a white light source, into a plurality of color component light beams (a red component light beam R, a green component light beam G and a blue component light beam B); and a plurality of imagers each configured to modulate a corresponding one of the color component light beams.

A white light beam emitted from a white light source such as a UHP (Ultra-high Pressure) lamp includes a yellow component light beam Ye in addition to a red component light beam R, a green component light beam G, and a blue component light beam B. The yellow component light beam Ye has a wavelength band between those of the red component light beam R and the green component light beam G.

In general, the white light source of this kind outputs a relatively large quantity of light in the wavelength band of the yellow component light beam Ye. For this reason, active use of the yellow component light beam Ye has been attempted to increase the quantity of projected image light which is projected by a projection display apparatus. However, although the use of the yellow component light beam Ye increases the quantity of output light projected by the projection display apparatus, this use decreases color purities.

In this respect, examples of the projection display apparatus include a projection display apparatus used for a home theater and the like and a projection display apparatus used for outputting data and the like.

In the projection display apparatus used for the home theater, it is preferable that priority be given to purities of the respective colors rather than the quantity of output light. On the other hand, in the projection display apparatus used for outputting data, it is preferable that priority be given to the quantity of light rather than purities of the respective colors.

As described above, there is a need to switch a projection display apparatus between a mode in which priority is given to purities of the respective colors (hereinafter referred to as a "color-purity priority mode") and a mode in which priority is given to the quantity of output light (hereinafter referred to as a "light-quantity priority mode") depending on what the projection display apparatus is used for.

In response to this, a propose has been made for a projection display apparatus that uses a dichroic filter capable of removing a predetermined wavelength band (for example, the wavelength band of the yellow component light beam Ye) (see Japanese Patent Application Publication No. 2000-137289, for example).

ILLUMINATION APPARATUS AND PROJECTION DISPLAY APPARATUS

CROSS REFERENCE TO RELATED APPLICATIONS

This application is based upon and claims the benefit of priority from prior Japanese Patent Application No. 2007-184791, filed on Jul. 13, 2007; and prior Japanese Patent Application No. 2008-165085, filed on Jun. 24, 2008 the entire contents of which are incorporated herein by reference.

BACKGROUND OF THE INVENTION

1. Field of the Invention

The present invention relates to an illumination apparatus and a projection display apparatus which separate a white light beam, emitted from a white light source, into a plurality of color component light beams, and modulate the plurality of color component light beams.

2. Description of the Related Art

Specifically, the dichroic filter is set in the optical path of a target color component light beam for the color-purity priority mode, whereas the dichroic filter is removed from the optical path of the target color component light beam for the light-quantity priority mode.

This mechanism makes it possible to switch a single projection display apparatus between the color-purity priority mode and the light-quantity priority mode.

However, the projection display apparatus of the foregoing type needs to move the dichroic filter mechanically. This makes it likely that the mechanism for moving the dichroic filter may break down.

SUMMARY OF THE INVENTION

An illumination apparatus (an illumination apparatus 120) according to a first aspect includes: a color separator (a dichroic mirror 71 and a dichroic mirror 72) configured to separate a white light beam, emitted from a white light source (a light source 10), into a plurality of color component light beams; and a plurality of imagers (liquid crystal panels 30) each configured to modulate a corresponding one of the plurality of color component light beams separated by the color separator. The illumination apparatus includes a polarization modulator (a polarization modulator 40) provided on the light incident side of one imager included in the plurality of imagers. The polarization modulator modulates the polarization direction of a modulation-object light beam which is part of a color component light beam guided to the one imager.

According to the first aspect, the polarization modulator modulates the polarization direction of the modulation-object light beam, which is part of the color component light beam entering the one imager. As a result, when the polarization modulator does not modulate the modulation-object light beam, the modulation-object light beam passes through the one imager. Accordingly, it is possible to increase the quantity of color component light beam outputted from the one imager (a light-quantity priority mode). On the other hand, when the polarization modulator modulates the modulation-object light beam, the modulation-object light beam is blocked by the polarization plate (the polarization plate provided to the light incident side) of the one imager, and the modulation-object light beam does not pass through the one imager. Accordingly, it is possible to increase the color purity of the color component light beam outputted from the one imager (a color-purity priority mode).

As described above, through the electrical control, the polarization modulator is switched between the light-quantity priority mode and the color-purity priority mode. Thus, the first aspect can suppress the mechanical failure in the illumination apparatus, in comparison with the prior art which requires to move a dichroic filter mechanically.

In the above-described aspect, the modulation-object light beam have a wavelength band other than a wavelength band of a high-color-purity component light beam in the color component light beam guided to the one imager. The high-color-purity component light beam has the wavelength band which increases the color purity of a monochrome.

In the first aspect, the polarization modulator switches between a state of modulating the polarization direction of the modulation-object light beam by 90° and a state of not modulating the polarization of the modulation-object light beam.

In the first aspect, the polarization modulator modulates the polarization direction of the modulation-object light beam in a range of 0° to 90°.

In the first aspect, the illumination apparatus further includes a controller (a controller 300) configured to control a modulation amount of the polarization direction of the modulation-object light beam modulated by the polarization modulator, depending on image input signals used for modulation amount control of the plurality of imagers.

In the first aspect, the controller calculates a saturation of each pixel, based on the image input signals. The controller controls the modulation amount of the polarization direction of the modulation-object light beam modulated by the polarization modulator, based on the saturation of each pixel.

In the first aspect, the illumination apparatus further include a plurality of polarization modulators respectively corresponding to the plurality of imagers as the polarization modulator. The controller calculates saturation in each of a plurality of hue ranges respectively corresponding to the plurality of imagers, based on the image input signals. The controller controls the modulation amounts of the polarization directions of the modulation-object light beams modulated by the plurality of polarization modulators respectively corresponding to the plurality of hue ranges, based on the saturation calculated in each of the plurality of hue ranges.

In the first aspect, the controller calculates a hue in each of a plurality of hue ranges respectively corresponding to the plurality of imagers, based on the image input signals. The controller adjusts the modulation amounts of the polarization directions of the modulation-object light beams modulated by the plurality of polarization modulators respectively corresponding to the plurality of hue ranges, based on the hues calculated in each of the plurality of hue ranges.

In the first aspect, the controller calculates a luminance, based on the image input signals. The controller adjusts the modulation amount of the polarization direction of the modulation-object light beam modulated by the polarization modulator, based on the luminance.

In the first aspect, the polarization modulator is configured of a plurality of areas. The controller calculates saturation in each of the plurality of areas, based on the image input signals corresponding to each of the plurality of areas. The controller controls the modulation amount of the polarization direction of the modulation-object light beam modulated by the polarization modulator for each of the plurality of areas, based on the saturation calculated in the each of the plurality of areas.

In the first aspect, the resolution of the polarization modulator is lower than respective resolutions of the plurality of imagers.

A projection display apparatus according to a second aspect includes: a color separator configured to separate a white light beam, emitted from a white light source, into a plurality of color component light beams; a plurality of imagers each configured to modulate a corresponding one of the plurality of color component light beams separated by the color separator; and a projection lens unit configured to project the plurality of color component light beams respectively modulated by the plurality of imagers. The projection display apparatus further includes a polarization modulator provided on the light incident side of one imager included in the plurality of imagers. The polarization modulator modulates the polarization direction of a modulation-object light beam which is part of a color component light beam guided to the one imager.

BRIEF DESCRIPTION OF THE DRAWINGS

FIG. 4 is a diagram for explaining a polarization modulator 40R according to the first embodiment.

FIG. 5 is a diagram for explaining a polarization modulator 40G according to the first embodiment.

DETAILED DESCRIPTION OF PREFERRED EMBODIMENTS

Figure 1:
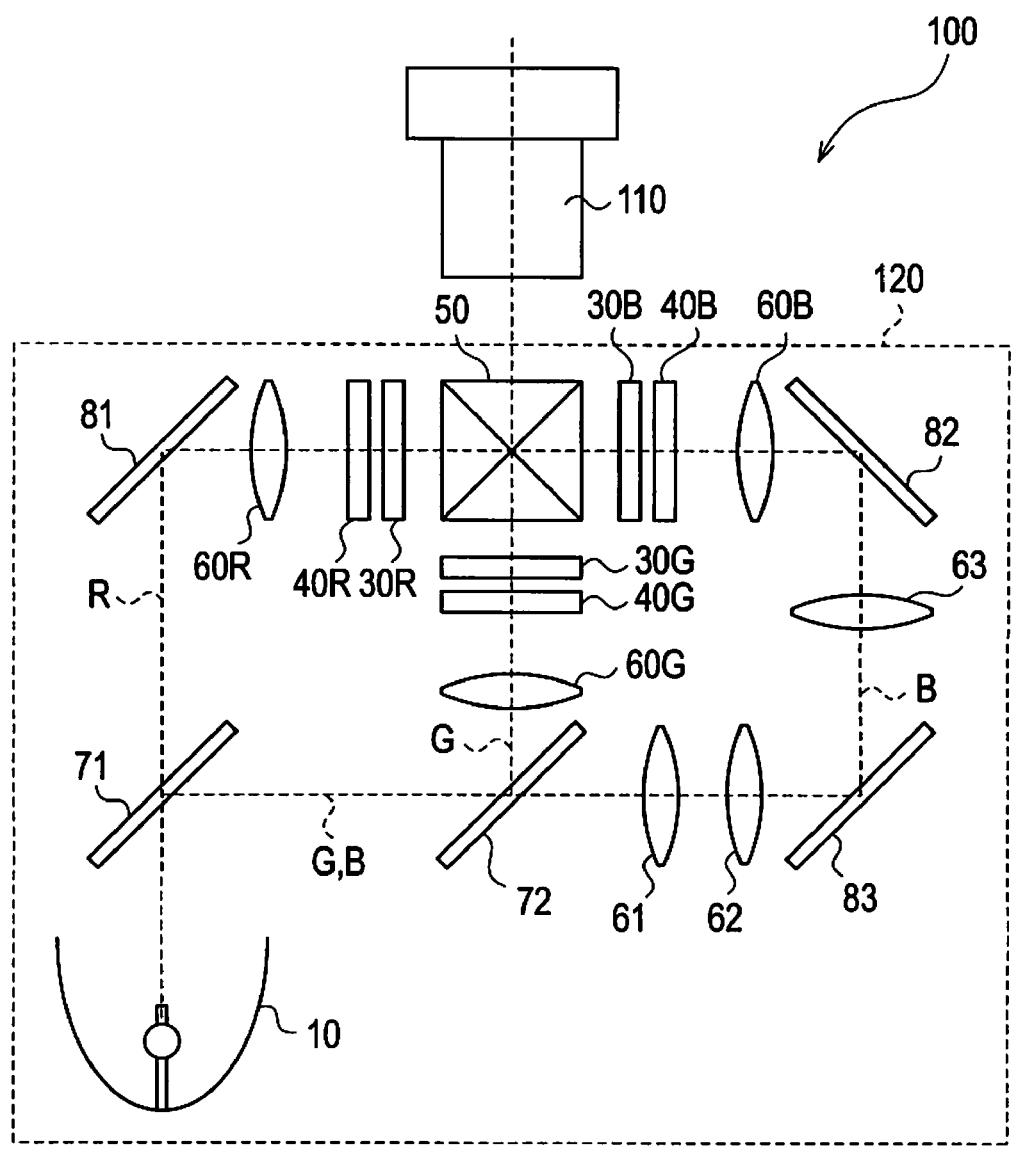
FIG. 1 is a diagram showing a configuration of a projection display apparatus 100 according to a first embodiment.

A projection display apparatus according to embodiments of the present invention will be described below with reference to the drawings. In the descriptions of the drawings, identical or similar reference numerals are given to identical or similar parts.

It should, however, be noted that the drawings are schematic and that the proportions among various dimensions differ from the actual ones. Accordingly, specific dimensions have to be judged by taking account of the descriptions given below. In addition, note that dimensional relations or the proportions among various drawings may differ from one drawing to another.

First Embodiment (Configuration of Projection Display Apparatus)

Descriptions will be provided for a projection display apparatus according to a first embodiment by referring to the related drawing. FIG. 1 is a diagram showing a configuration of a projection display apparatus 100 according to the first embodiment.

As shown in FIG. 1, the projection display apparatus 100 includes a projection lens unit 110 and an illumination apparatus 120.

Note that FIG. 1 omits components such as a fly-eye lens unit configured to uniformize a light beam emitted from a light source 10 and a PBS (Polarized Beam Splitter) configured to collimate the light beam emitted from the light source 10 in the polarization direction.

The projection lens unit 110 projects an image light beam outputted from the illumination apparatus 120 onto a screen (not illustrated) or the like.

The illumination apparatus 120 includes: the light source; a plurality of liquid crystal panels 30 (a liquid crystal panel 30R, a liquid crystal panel 30G and a liquid crystal panel 30B); a plurality of polarization modulators 40 (a polarization modulator 40R, a polarization modulator 40G and a polarization modulator 40B); and a cross dichroic prism 50.

The light source 10 is a UHP lamp configured to emit a white light beam, or the like. Accordingly, the light beam which the light source 10 emits includes at least a red component light beam R, a green component light beam G and a blue component light beam B.

The liquid crystal panel 30R modulates the red component light beam R, depending on an image input signal (a red input signal Rin). Similarly, the liquid crystal panel BOG and the liquid crystal panel 30B modulate the green component light beam G and the blue component light beam B, depending on their corresponding image input signals (a green input signal Gin and a blue input signal Bin), respectively.

In this respect, polarization plates (not illustrated) are respectively provided on the light incident side and the light output side of each of these liquid crystal panels 30.

The polarization modulator 40R is provided on the light incident side of the liquid crystal panel 30R. The polarization modulator 40R modulates the polarization direction of a modulation-object light beam (hereinafter referred to as an "modulation-object light beam Rr) which is part of the red component light beam R entering the liquid crystal panel 30R. In this respect, in a mode where priority is given to the color purity of the red component light beam P, the modulation-object light beam Rr has a wavelength band other than the wavelength band of a high-color-purity component light beam, in a color component light beam, the high-color-purity component light beam having the wavelength band which increases the color purity of the red monochrome (hereinafter referred to as a "red high-color-purity component light beam Rt). In other words, the polarization modulator 40R is configured to be capable of modulating the modulation-object light beam Hr without modulating the red high-color-purity light beam Rt.

In this respect, the polarization modulator 40R is an optical element configured to be capable of switching between a state of not modulating the polarization direction of its corresponding modulation-object light beam Rr and a state of modulating the polarization direction of its corresponding modulation-object light beam Rr by 90°. Otherwise, the polarization modulator 40R may be an optical element which modulates its corresponding modulation-object light beam Rr in a range of 0° to 90°. Detailed descriptions will be provided for the polarization modulator 40R later (see FIG. 3).

Similarly, the polarization modulator 40G and the polarization modulator 40B are provided on the light incident sides of the liquid crystal panel 30G and the liquid crystal panel 30B, respectively.

The polarization modulator 40G modulates the polarization direction of its corresponding modulation-object light beam (hereinafter referred to as a "modulation-object light beam Gr) which is part of the green component light beam a entering the liquid crystal panel 30G. In this respect, in the mode where priority is given to the color purity of the green component light beam G, the modulation-object light beam Gr has a wavelength band other than the wavelength band of a high-color-purity component light beam in a color component light beam, the high-color-purity component light beam having the wavelength band which increases the color purity of the green monochrome (hereinafter referred to as a "green high-color-purity component light beam Gt). In other words, the polarization modulator 40G is configured to be capable of modulating the modulation-object light beam Gr without modulating the green high-color-purity light beam Gt.

The polarization modulator 40B modulates the polarization direction of its corresponding modulation-object light beam (hereinafter referred to as a "modulation-object light beam Br) which is part of the blue component light beam B entering the liquid crystal panel 30B. In this respect, in the mode where priority is given to the color purity of the blue component light beam B, the modulation-object light beam Br has a wavelength band other than the wavelength band of a high-color-purity component light beam in a color component light beam, the high-color-purity component light beam having the wavelength band which increases the color purity of the blue monochrome (hereinafter referred to as a "blue high-color-purity component light beam Bt). In other words, the polarization modulator 40B is configured to be capable of modulating the modulation-object light beam Br without modulating the blue high-color-purity light beam Bt.

Like the polarization modulator 40R, the polarization modulator 40G (or the polarization modulator 40B) is an optical element configured to be capable of selectively switching between a state of not modulating the polarization direction of the modulation-object light beam Gr (or the modulation-object light beam Br) and a state of modulating the polarization direction of the modulation-object light beam Gr (or the modulation-object light beam Br) by 90°. Otherwise, the polarization modulator 40G (or the polarization modulator 40B) may be an optical element which modulates the polarization direction of the modulation-object light beam Gr (or the modulation-object light beam Br) in the range of 0° to 90°.

Once each polarization modulator 40 modulates the polarization direction of the corresponding modulation-object light beam, the polarization plate (that is, the incident side polarization plate) provided on the light-incident side of the corresponding liquid crystal panel 30 blocks the modulation-object light beam. It should be noted that this scheme increases the color purity of each color component light beam.

It goes without saying that each incident side polarization plate is designed to transmit its corresponding high-color purity component light beam.

The cross dichroic prism 50 is a color combiner configured to combine the light beams respectively outputted from the liquid crystal panel 30R, the liquid crystal panel 30G and the liquid crystal panel 30B. The combined light beam combined by the cross dichroic prism 50 is guided to the projection lens unit 110.

The illumination apparatus 120 includes a group of multiple lenses (a lens 60R, a lens 60G, a lens 60B as well as lenses 61 to 63), a group of multiple dichroic mirrors (a dichroic mirror 71 and a dichroic mirror 72) and a group of multiple reflection mirrors (a reflection mirror 81, a reflection mirror 82 and a reflection mirror 83).

The lens 60R collects the red component light beam R so as to irradiate the projection lens unit 110 with the light beam outputted from the liquid crystal panel 30R. Similarly, the lens 60G collects the green component light beam G so as to irradiate the projection lens unit 110 with the light beam outputted from the liquid crystal panel 30G. The lens 60B collects the blue component light beam B so as to irradiate the projection lens unit 110 with the light beam outputted from the liquid crystal panel 30B. The lenses 61 to 63 are a relay lens configured to adjust the difference in length between the optical path of the blue component light beam B and the optical path of each of the red component light beam R and the green component light beam G.

The dichroic mirror 71 is an optical element configured to separate the white light beam into the red component light beam R and a combined light beam including the green component light beam G and the blue component light beam B. Specifically, the dichroic mirror 71 reflects the combined light beam including the green component light beam G and the blue component light beam B, and transmits the red component light beam R.

The dichroic mirror 72 is an optical element configured to separate the combined light beam, separated by the dichroic mirror 71, into the green component light beam G and the blue component light beam B. Specifically, the dichroic mirror 72 reflects the green component light beam G, and transmits the blue component light beam B.

The reflection mirror 81 is a mirror configured to reflect the red component light beam R separated by the dichroic mirror 72, and thus to guide the resultant red component light beam R to the liquid crystal panel 30R.

The reflection mirror 82 and the reflection mirror 83 are mirrors configured to reflect the blue component light beam B separated by the dichroic mirror 72, and thus to guide the resultant blue component light beam B to the liquid crystal panel 30B.

(Wavelength Bands of Color Component Light Beams)

Figure 2:
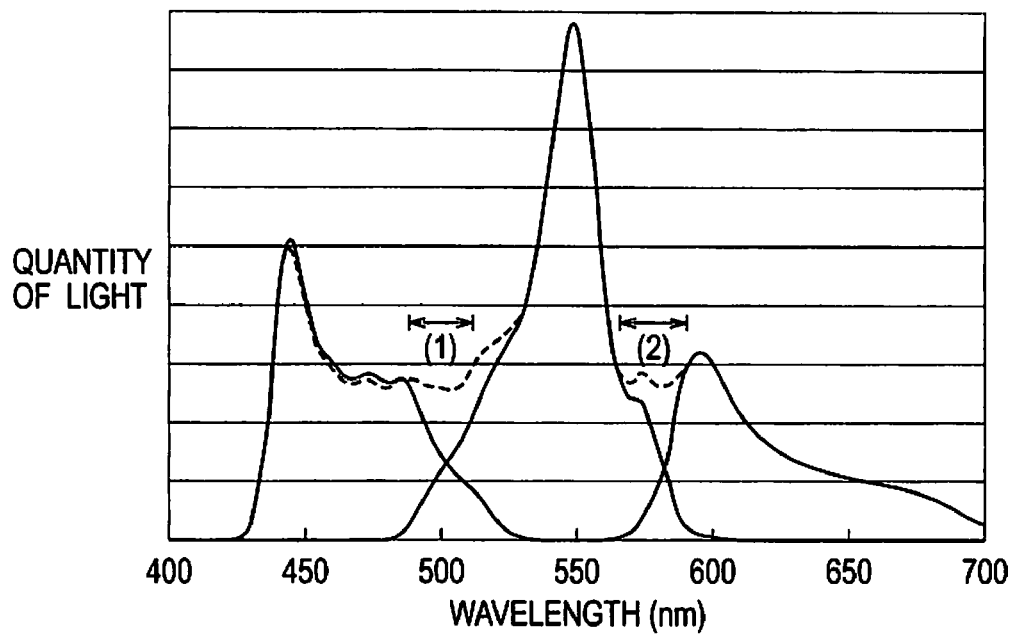
FIG. 2 is a diagram showing wavelength bands of the respective color component light beams according to the first embodiment.

Descriptions will be provided for the wavelength bands of the respective color component light beams according to the first embodiment by referring to the related drawing. FIG. 2 is a diagram showing wavelength bands of the respective color component light beams according to the first embodiment.

As shown in FIG. 2, the red component light beam R has the band with the longest wavelength band among the three component light beams. On the other hand, the blue component light beam B has the band with the shortest wavelength band among the three component light beams. The green component light beam G has the wavelength band which exists between the wavelength band of the blue component light beam B and the wavelength band of the red component light beam R.

In this respect, the cutoff wavelengths of the color separators (the dichroic mirror 71 and the dichroic mirror 72) are changed depending on the incidence angles at which the color component light beams enter the color separators, respectively. As a result, the boundary between each neighboring two of the wavelength bands of the respective color component light beams (the boundary (1) and the boundary (2)) is set up in a vicinity of the corresponding two center cutoff wavelengths of the respective color separators. On the other hand, as shown in FIG. 2, the quantity of each color component light beam decreases as its wavelength becomes longer (or shorter) from the peak wavelength at which the quantity of the color component light beam is the largest.

For this reason, in a mode (a light-quantity priority mode) in which priority is given to the quantity of each output color component light beam, it is preferable to use all of the color component light beams separated by the color separators. On the other hand, in a mode (a color-purity priority mode) in which priority is given to the color purity of each color component light beam, it is not preferable to use all the color component light beams separated by the color separators.

In the first embodiment, in the color-purity mode, each polarization modulator 40 modulates only the polarization direction of its corresponding modulation-object component light beam, and thereby allows each color component light beam with the wavelength band thus narrowed down to pass the corresponding liquid crystal panel 30. This increases the color purity of each color component light beam.

Specifically, the polarization plate provided on the light-incident side of the liquid crystal panel 30R blocks the modulation-object light beam Rr whose polarization direction has been modulated by the polarization modulator 40R. In this respect, the modulation-object light beam Rr is a light beam having a wavelength band which is shorter than the wavelength band of the red high-color-purity component light beam Rt.

In addition, the polarization plate provided on the light-incident side of the liquid crystal panel 30B blocks the modulation-object light beam Br whose polarization direction has been modulated by the polarization modulator 40B. In this respect, the modulation-object light beam Br is a light beam having a wavelength band which is longer than the wavelength band of the blue high-color-purity component light beam Bt.

Furthermore, the polarization plate provided on the light-incident side of the liquid crystal panel 30G blocks the modulation-object light beam Gr whose polarization direction has been modulated by the polarization modulator 40G. In this respect, the modulation-object light beam Gr is either or both of a light beam having a wavelength band which is shorter than the wavelength band of the green high-color-purity component light beam Gt and a light beam having a wavelength band which is longer than the wavelength band of the green high-color-purity component light beam Gt.

The adjustment of the cutoff wavelengths of the respective color separators can increase the color purity of a target color component light beam, but at the same time decreases the color purities of the color component light beams other that the target color component light beam. For example, assume a case where the cutoff wavelength of the dichroic mirror 71 is adjusted to a longer wavelength in order to increase the color purity of the red component light beam R. In such a case, it should be noted that the color purity of the green component light beam G decreases.

(Example of Cutoff Wavelength)

In the case of the prior art in which the three color component light beams are used, suppose that the center cutoff wavelength of a dichroic mirror for separating the red component light beam R and the green component light beam G from each other is 570 nm to increase the color purity of the green color component light beam G. In this case, for the purpose of increasing the color purity of the red component light beam Rt, a cut filter for cutting off light with a wavelength not longer than 590 nm is provided in the optical path of the red component light beam R separated by the corresponding dichroic mirror. As a result, a color component light beam with a wavelength band of 570 nm to 590 nm (the yellow component light beam Ye) is cut off.

In contrast, in a case (1) where the four color component light beams (including the yellow component light beam Ye) are used, the center cutoff wavelength of the dichroic mirror configured to separate the red component light beam R and the green component light beam G from each other is set longer than the center cutoff wavelength according to the prior art (for example, at 575 nm). On the other hand, the cut filter cuts off light with a wavelength shorter than the wavelength of the light which the cut filter according to the prior art cuts off (for example, with a wavelength shorter than 585 nm).

That is, in the case (1), the yellow component light beam Ye with a wavelength band of approximately 570 nm to 575 nm is superimposed on the green component light beam G, and the yellow component light beam Ye with a wavelength band of approximately 585 nm to 590 nm is superimposed on the red component light beam R.

Furthermore, in a case (2) where the four color component light beams (including the yellow component light beam Ye) are used, the center cutoff wavelength of the dichroic mirror configured to separate the red component light beam R and the green component light beam G from each other is set longer than the center cutoff wavelength concerning the case (1) (for example, at 580 nm). On the other hand, no cut filter is provided.

That is, in the case (2), the yellow component light beam Ye with a wavelength band of approximately 570 nm to 580 nm is superimposed on the green component light beam G, and the yellow component light beam Ye with a wavelength band of approximately 580 nm to 590 nm is superimposed on the red component light beam R.

In the first embodiment, when the color purity of the green component light beam needs to be increased, the polarization modulator 40G modulates the modulation-object light beam Gr, and thereby allows the green component light beam G with the wavelength band thus narrowed down to pass the liquid crystal panel 30G. Similarly, when the color purity of the red component light beam G needs to be increased, the polarization modulator 40R modulates the modulation-object light beam Rr, and thereby allows the red component light beam R with the wavelength band thus narrowed down to pass the liquid crystal panel 30R.

In short, in the first embodiment, any one of the cutoff wavelength of the case (1) and the cutoff wavelength of the case (2) may be used as the cutoff wavelength of the dichroic mirror 72 configured to separate the red component light beam R and the green component light beam G from each other.

(Configuration of Polarization Modulator)

Figure 3:
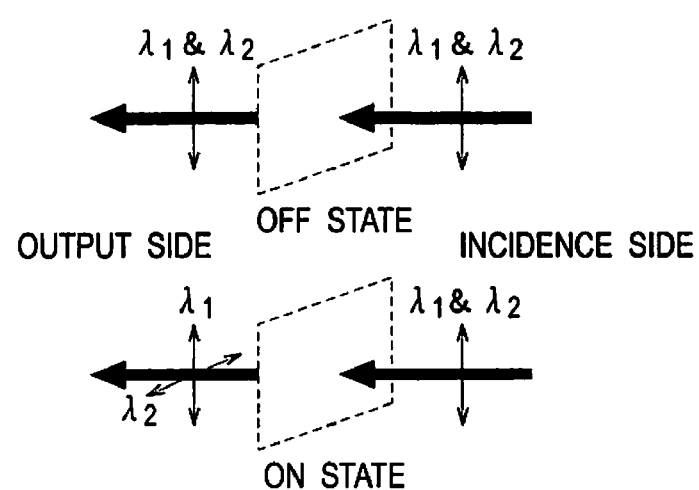
FIG. 3 is a diagram for explaining a polarization modulator 40 according to the first embodiment.

Descriptions will be provided for a configuration of the polarization modulator according to the first embodiment by referring to the related drawings. FIG. 3 is a diagram for explaining the polarization modulator 40 according to the first embodiment. It should be noted that the polarization modulator 40R, the polarization modulator 40G and the polarization modulator 40B have the same configuration.

In FIG. 3, reference numeral $\lambda_1$ denotes the high-color-purity component light beam, and $\lambda_2$ denotes the modulation-object light beam. As shown in FIG. 3, in the state where no voltage is applied to the polarization modulator 40 (n the OFF state), the polarization modulator 40 modulates neither the polarization direction of $\lambda_1$ nor the polarization direction of $\lambda_2$. On the other hand, in the state where a voltage is applied to the polarization modulator 40 (in the ON state), the polarization modulator 40 does not modulate the polarization direction of $\lambda_1$, but selectively modulates the polarization direction of $\lambda_2$ by 90°.

By taking the polarization modulator 40R as an example, descriptions will be provided for the modulation of the modulation-object light beam Rr. FIG. 4 it a diagram for explaining the polarization modulator 40R according to the first embodiment. In FIG. 4, the vertical axis indicates the ratio (the transmittance) at which the polarization modulator 40R transmits the red component light beam R (the modulation-object light beam Rr) without modulating the red component light beam R (the modulation-object light beam Rr) after the red component light beam R (the modulation-object light beam Rr) enters the polarization modulator 40R. The horizontal axis indicates the wavelength band of the red component light beam R. In FIG. 4, it should be noted that the polarization direction of the red component light beam R (the modulation-object light beam Rr) is modulated more as the transmittance becomes lower.

As shown in FIG. 4, the transmittance of the red component light beam R (the modulation-object light beam Rx) with a wavelength band shorter than a predetermined wavelength (for example, 600 nm) decreases as a voltage applied to the polarization modulator 40R increases. In other words, as the voltage applied to the polarization modulator 40R increases, the polarization direction of the modulation-object light beam is modulated more.

Next, by taking the polarization modulator 40G as an example, descriptions will be provided for the modulation of the modulation-object light beam Gr. FIG. 5 is a diagram for explaining the polarization modulator 40G according to the first embodiment. In FIG. 5, the vertical axis indicates the ratio (the transmittance) at which the polarization modulator 40G transmits the green component light beam G (the modulation-object light beam Gr) without modulating the green component light beam a (the modulation-object light beam Gr) after the green component light beam G (the modulation-object light beam Gr) enters the polarization modulator 40G. The horizontal axis indicates the wavelength of the green component light beam G. It should be noted that the polarization direction of the green component light beam a (the modulation-object light beam Gr) is modulated more as the transmittance becomes lower.

As shown in FIG. 5, as a voltage applied to the polarization modulator 40G increases, the transmittance of the green component light beam a (the modulation-object light beam Gr) with a wavelength band longer than a predetermined wavelength for example, 570 nm) decreases. Similarly, as the voltage applied to the polarization modulator 40G increases, the transmittance of the green component light beam G (the modulation-object light beam Gr) with a wavelength band shorter than a predetermined wavelength for example, 520 nm) decreases. In other words, as the voltage applied to the polarization modulator 40G increases, the polarization direction of the modulation-object light beam Gr is modulated more.

(Color Reproduction)

Figure 6:
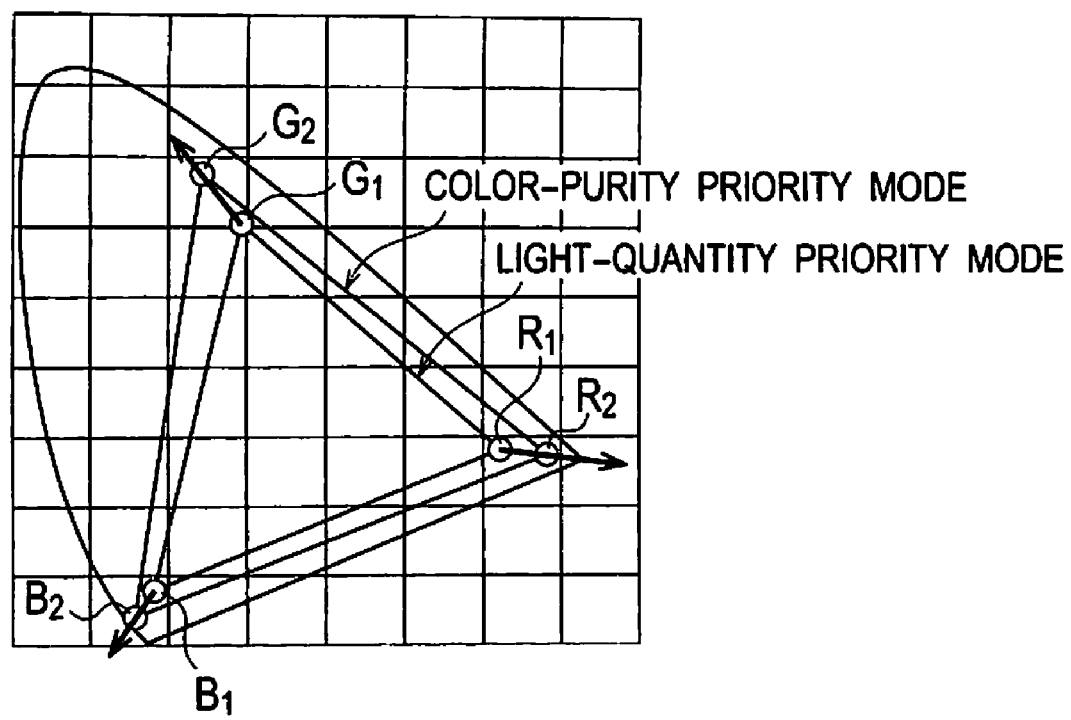
FIG. 6 is a diagram showing color reproduction ranges according to the first embodiment.

Descriptions will be provided for color reproduction ranges according to the first embodiment by referring to the related drawing. FIG. 6 is a diagram for explaining the color reproduction ranges according to the first embodiment.

In the light-quantity priority mode, as shown in FIG. 6, part which reaches a corresponding one of the polarization modulators (the polarization modulator 40R, the polarization modulator 40G and the polarization modulator 40B) out of the color component light beam separated by the corresponding color separator is used. This scheme decreases the color purity of each color component light beam. As a result, in the light-quantity priority mode, the color reproduction range is a range indicated by $R_1$, $G_1$ and $B_1$.

On the other hand, in the color-purity priority mode, only parts of the color component light beams separated by the color separators (that is, the high-color-purity light beams) are used. This scheme increases the color purities of the respective color component light beams. As a result, in the color-purity priority mode, the color reproduction range is a range indicted by $R_2$, $G_2$ and $B_2$.

In this manner, the color reproduction range in the color-purity priority mode is wider than the color reproduction range in the light-quantity priority mode.

(Configuration of Controller)

Figure 7:
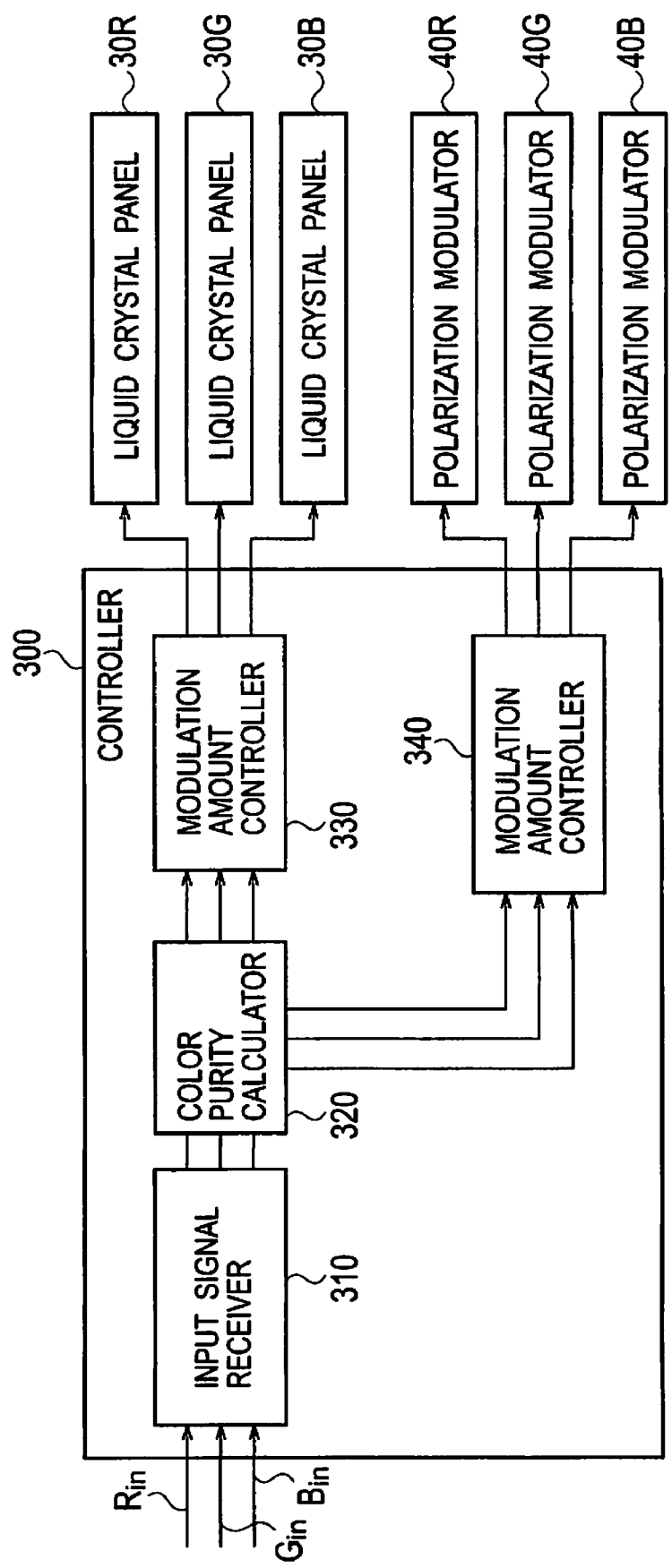
FIG. 7 is a block diagram showing a configuration of a controller 300 according to the first embodiment.

Descriptions will be provided for a configuration of a controller according to the first embodiment by referring to the related drawing. FIG. 7 is a block diagram showing the configuration of a controller 300 according to the first embodiment.

As shown in FIG. 7, the controller 300 includes an input signal receiver 310, a color purity calculator 320, a modulation amount controller 330, and a modulation amount controller 340.

The input signal receiver 310 receives image input signals including a red input signal Rin, a green input signal Gin and a blue input signal Bin. Specifically, the input signal receiver 310 receives image signals from appliances such as a DVD player and a TV tuner.

Based on the image signals, the color purity calculator 320 calculates the color purities respectively corresponding to the red input signal Rin, the green input signal Gin and the blue input signal Bin. Subsequently, the color purity calculator 320 adjusts the quantities and color purities of the color component light beams, and concurrently instructs the modulation amount controller 330 to control the amounts of modulation carried out by the liquid crystal panels 80, as well as instructs the modulation amount controller 340 to control the modulations carried out by the polarization modulators 40.

For example, in the color-purity priority mode, the color purity calculator 320 instructs the modulation amount controller 340 to modulate the modulation-object light beams. In addition, the color purity calculator 320 instructs the modulation amount controller 330 to control the amounts of modulation with the image input signals being corrected to compensate the decreases in the quantities of the color component light beams which occur due to the modulation of the modulation-object light beams.

On the other hand, in the light-quantity priority mode, the color purity calculator 320 instructs the modulation amount controller 340 not to modulate the modulation-object light beams. In addition, the color purity calculator 320 instructs the modulation amount controller 330 to control the amounts of modulation with the image input signals being corrected to increase the quantities of the color component light beams further.

In this respect, a user may switch between the color-purity priority mode and the light quantity priority mode, as in the prior art.

In addition, the switch may be made between the color-purity priority mode and the light-quantity priority mode for each color, depending on the color purities of the colors which correspond to the image input signals.

In a case where, for example, the color purity corresponding to the red input signal Rin is equal to or higher than a predetermined color purity ($T_R$) the polarization direction of the modulation-object light beam Rr may be modulated (in the color-purity priority mode). On the other hand, in a case where the color purity corresponding to the red input signal Rin is lower than the predetermined color purity ($T_R$), the polarization direction of the modulation-object light beam Rr dose not have to be modulated (in the light-quantity priority mode).

Similarly, in a case where the color purity corresponding to the green input signal Gin is equal to or higher than a predetermined color purity ($T_G$), the polarization direction of the modulation-object light beam Gr may be modulated (in the color-purity priority mode). On the other hand, in a case where the color purity corresponding to the green input signal Gin is lower than the predetermined color purity ($T_G$), the polarization direction of the modulation-object light beam Gr does not have to be modulated (in the light-quantity priority mode).

In a case where the color purity corresponding to the blue input signal Bin is equal to or higher than a predetermined color purity ($T_B$), the polarization direction of the modulation-object light beam Br may be modulated (in the color-purity priority mode). On the other hand, in a case where the color purity corresponding to the blue input signal Bin is lower than the predetermined color purity ($T_B$), the polarization direction of the modulation-object light beam Br does not have to be modulated (in the light-quantity priority mode).

It should be noted that the predetermined color purity ($T_R$), the predetermined color purity ($T_G$) and the predetermined color purity ($T_B$) are set up depending on the specification required for the projection display apparatus, the characteristics of the respective colors, and the like.

Furthermore, in a case where the polarization modulators 40 are configured to be capable of modulating the polarization directions of the respective modulation-object light beams in the range of 0° to 90°, the color purity calculator 320 instructs the modulation amount controller 340 to modulate the modulation-object light beams with their corresponding amounts of modulation depending on the color purities calculated based on the image input signals. In response to this, the color purity calculator 320 instructs the modulation amount controller 330 to control the modulation amounts with the image input signals being corrected depending on the modulation amount of the corresponding modulation-object light beams.

In response to the instruction from the color purity calculator 320, the modulation amount controller 330 controls the modulation amount in each liquid crystal panel 30, pixel by pixel in the liquid crystal panel 30.

Based on the instruction from the color purity calculator 320, the modulation amount controller 340 controls each amount of modulation carried out by the corresponding polarization modulator 40.

(Advantages and Effects)

In the projection display apparatus 100 according to the first embodiment, the polarization modulators 40 modulate the polarization directions of the corresponding one of modulation-object light beams (the modulation-object light beam Rr, the modulation-object light beam Gr and the modulation-object light beam Br) which are parts of the color component light beams entering the liquid crystal panels 30.

Accordingly, when the polarization modulators 40 do not modulate the respective modulation-object light beams, the modulation-object light beams pass the respective liquid crystal panels 30. This scheme increases the quantities of color component light beams outputted from the respective liquid crystal panels 30 (in the light-quantity priority mode). On the other hand, when the polarization modulators 40 modulate the respective modulation-object light beams, the modulation-object light beams are blocked by the polarization plates of (the polarization plates provided on the light incident sides of) the liquid crystal panels 30. As a result, the modulation-object light beams do not pass the respective liquid crystal panels 30. This scheme increases the color purities of the color component light beams outputted from the respective liquid crystal panels 30 (in the color-purity priority mode).

As described above, through the electrical control, the polarization modulators 40 are switched between the light-quantity priority mode and the color-purity priority mode. Accordingly, the first embodiment checks the mechanical failure which would otherwise occur in the illumination apparatus 120 and the projection display apparatus 100 in comparison with the prior art.

In the case of the projection display apparatus 100 according to the first embodiment, in the mode in which priority is given to the color purities of the respective color component light beams, the modulation-object light beams (the modulation-object light beam Rr, the modulation-object light beam Gr and the modulation-object light beam Br) have the wavelength bands other than the wavelength bands of the high-color-purity component light beams which the liquid crystal panels 30 modulate.

As a result, in the color-purity priority mode, the color purities of the respective color component light beams can be increased according to a specification requested for the projection display apparatus 100.

In the case of the projection display apparatus 100 according to the first embodiment, the controller (the modulation amount controller 340) controls the amounts by which the polarization modulators modulate the modulation-object light beams depending on the color purities calculated based on the image input signals. As a result, the projection display apparatus 100 is capable of switching to an appropriate mode depending on the types of projected image.

Second Embodiment

Descriptions will be provided for a second embodiment by referring to the related drawings. The second embodiment will be described focusing chiefly on what makes the second embodiment different from the first embodiment.

Specifically, in the first embodiment, the polarization modulator 40R, the polarization modulator 40G and the polarization modulator 40B are provided on the light incident sides of the liquid crystal panel 30R, the liquid crystal panel 30G and the liquid crystal panel 30B, respectively. On the other hand, in the second embodiment, instead of the polarization modulator 40R and the polarization modulator 40G, a polarization modulator 40X is provided.

In this respect, the polarization modulator 40X is provided in the optical path of a combined light beam including the red component light beam R and the green component light beam G. The polarization modulator 40X is configured to be capable of modulating the polarization direction of a modulation-object light beam having a wavelength band in a vicinity of the boundary between the red component light beam R and the green component light beam G.
(Configuration of Projection Display Apparatus)

Figure 8:
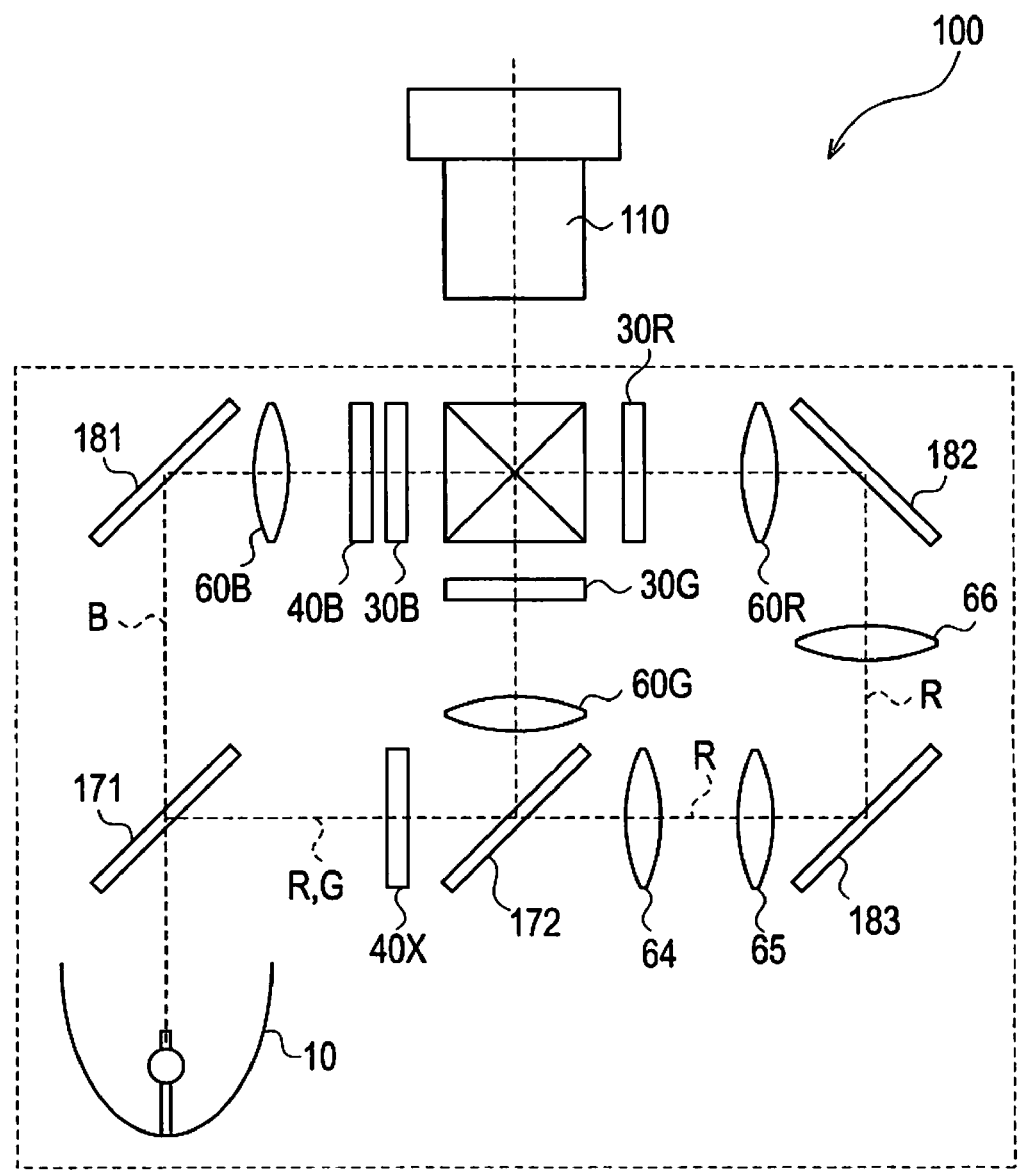
FIG. 8 is a diagram showing a configuration of a projection display apparatus 100 according to a second embodiment.

Descriptions will be provided for a configuration of a projection display apparatus according to the second embodiment by referring to the related drawing. FIG. 8 is diagram showing the configuration of the projection display apparatus 100 according to the second embodiment.

As shown in FIG. 8, the illumination apparatus 120 includes the polarization modulator 40X instead of the polarization modulator 40R and the polarization modulator 40G. In addition, the illumination apparatus 120 includes lenses 64 to 66 (relay lenses) configured to adjust the difference in length between the optical path of the red component light beam R and the optical path of each of the green component light beam G and the blue component light beam B instead of the lenses 61 to 63.

The polarization modulator 40X is provided in the optical path of the combined light beam (including the red component light beam R and the green component light beam a) separated by the dichroic mirror 171 between the dichroic mirror 171 and the dichroic mirror 172. The polarization mirror 40X modulates the polarization direction of a modulation-object light beam (hereinafter referred to as an "modulation-object light beam Ye) which is part of the combined light beam separated by the dichroic mirror 171.

In this respect, the modulation-object light beam Ye has a wavelength band in a vicinity of the boundary between the red component light beam R and the green component light beam G. Specifically, the polarization modulator 40X is configured to be capable of modulating the modulation-object light beam Ye without modulating the polarization directions respectively of the red high-color-purity component light beam Rt and the green high-color-purity component light beam Gt.

In this respect, the polarization modulator 40X is configured to be capable of selectively switching between the state of not modulating the polarization direction of the modulation-object light beam Ye and the state of modulating the polarization direction of the modulation-object light beamYe by 90°. The polarization modulator 40X may be an optical element configured to modulate the polarization direction of the modulation-object light beam Ye in a range of 0° to 90°.
(Configuration of Polarization Modulator)

Figure 9:
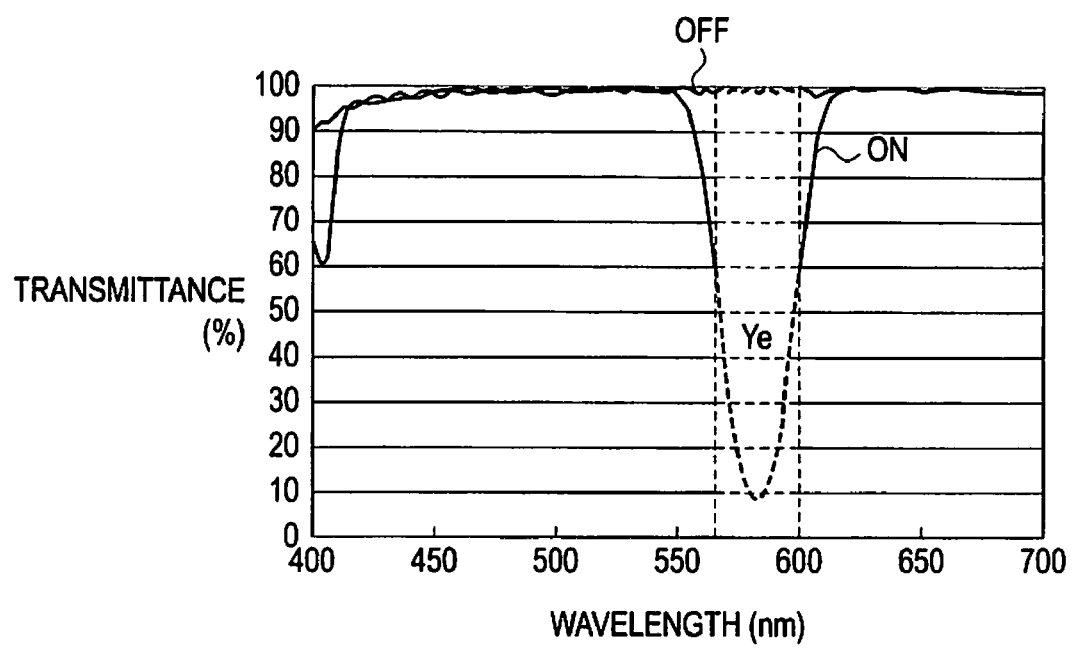
FIG. 9 is a diagram for explaining a polarization modulator 40X according to the second embodiment.

Descriptions will be provided for a configuration of the polarization modulator according to the second embodiment by referring to the related drawing. FIG. 9 is a diagram for explaining the polarization modulator 40X according to the second embodiment. In FIG. 9, the vertical axis indicates the ratio (the transmittance) at which the polarization modulator 40X transmits the combined light beam (the modulation-object light beam Ye) without modulating the combined light beam after the combined light beam enters the polarization modulator 40X. The horizontal axis indicates the wavelength of the combined light beam. In FIG. 9, it should be noted that the polarization direction of the combined light beam (the modulation-object light beam Ye) is modulated more as the transmittance becomes lower.

As shown in FIG. 9, in a state where a voltage is applied to the polarization modulator 40X (in the ON state), the transmittance of the combined light beam (the modulation-object light beam Ye) with a wavelength band not longer than a predetermined wavelength (for example, 600 nm) decreases. Similarly, in the state where the voltage is applied to the polarization modulator 40X (in the ON state), the transmittance of the combined light beam (the modulation-object light beam Ye) with a wavelength band not shorter than another predetermined wavelength (for example, 570 nm) decreases. In other words, in the case where the voltage is applied to the polarization modulator 40X (in the ON state), the polarization direction of the modulation-object light beam Ye (that is, the yellow component light beam Ye) having the wavelength band in the vicinity of the boundary between the red component light beam R and the green component light beam G is modulated.

The illumination apparatus 120 includes the dichroic mirror 171, the dichroic mirror 172, a refection mirror 181, a reflection mirror 182 and a reflection mirror 183 instead of the dichroic mirror 71, the dichroic mirror 72, the reflection mirror 81, the reflection mirror 82 and the reflection mirror 83.

The dichroic mirror 171 is an optical element configured to separate the white light beam into the combined light beam including the red component light beam R and the green component light beam G as well as the blue component light beam B. Specifically, the dichroic mirror 171 reflects the combined light beam including the red component light beam R and the green component light beam G, and transmits the blue component light beam B.

The dichroic mirror 172 is an optical element configured to separate the combined light beam, separated by the dichroic mirror 171, into the red component light beam R and the green component light beam G. Specifically, the dichroic mirror 172 reflects the green component light beam G, and transmits the red component light beam R.

The reflection mirror 181 is a mirror configured to reflect the blue component light beam B separated by the dichroic mirror 171, and thus to guide the blue component beam light B to the liquid crystal panel 30B.

The reflection mirror 182 and the reflection mirror are mirrors configured to reflect the red component light beam R separated by the dichroic mirror 172, and thus to guide the red component light beam R to the liquid crystal panel 30R.

(Advantages and Effects)

In the projection display apparatus 100 according to the second embodiment, the polarization modulator 40X is provided in the optical path of the combined light beam including the red component light beam R and the green component light beam G. The polarization modulator 40X modulates the polarization direction of the modulation-object light beam Ye (that is, the yellow component light beam Ye) having the wavelength band in the vicinity of the boundary between the red component light beam R and the green component light beam G.

That is, with respect to the red component light beam R and the green component light beam G, although the projection display apparatus 100 is provided with neither the polarization modulator 40R nor the polarization modulator 40G, the polarization modulator 40X enables the projection display apparatus 100 to be switched between the light-quantity priority mode and the color-purity priority mode.

As described above, the second embodiment can bring about the same effect as the first embodiment, and additionally can make the number of optical elements included in the illumination apparatus 120 (the projection display apparatus 100) smaller than the first embodiment.

Third Embodiment

Descriptions will be provided for a third embodiment by referring to the related drawings. The third embodiment will be described focusing chiefly on what makes the third embodiment different from the first embodiment.

Specifically, in the third embodiment, the controller 300 controls the amounts by which the polarization modulators 40 modulate the polarization directions of the respective modulation-object light beams.

(First Example of Modulation Amount Control)

Based on the image input signals including the red input signal Rin, the green input signal Gin and the blue input signal Bin, the above-described color purity calculator 320 included in the controller 300 calculates the saturation of the plurality of pixels forming an entire frame. Subsequently, based on the saturation of the plurality of pixels, the color purity calculator 320 calculates an average of the saturation (hereinafter referring to as an "average saturation ($S_{ave}$)").

Based on the average saturation ($S_{ave}$), the color purity calculator 320 determines a color reproduction range enlargement ratio (r). The color purity calculator 320 notifies the modulation amount controller 340 of the color reproduction range enlargement ratio (r). In this respect, the color reproduction range enlargement ratio (r) is a ratio with which the color reproduction range is enlarged with respect to the color reproduction range in the light-quantity priority mode.

Figure 10:
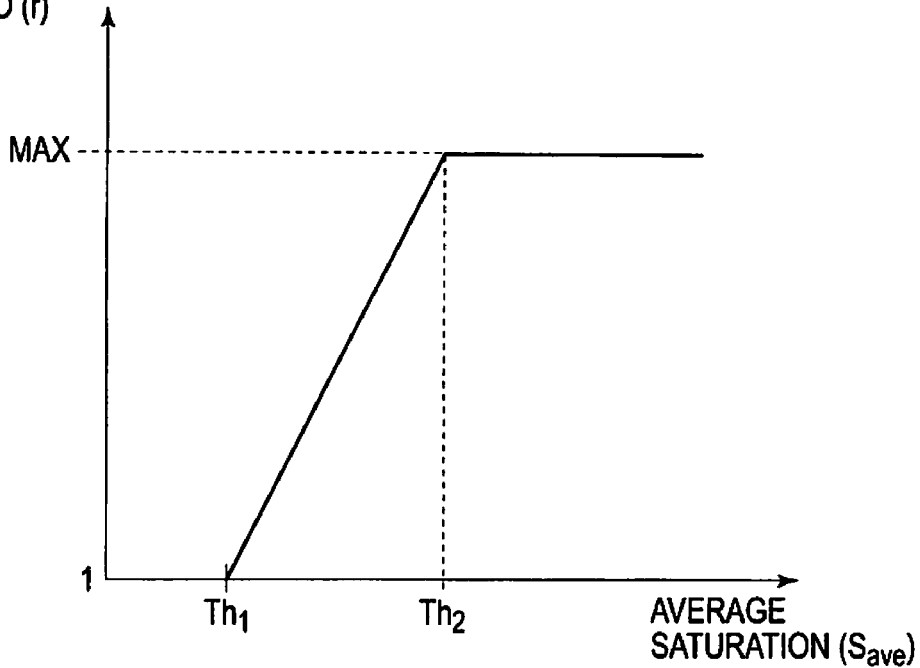
FIG. 10 is a diagram for explaining an example of how an amount of modulation is controlled according to a third embodiment.

Specifically, as shown in FIG. 10, the color reproduction range enlargement ratio (r) is in a range of 1 to MAX. When the average saturation ($S_{ave}$) is in a range of 0 to a threshold $Th_1$, the color purity calculator 320 sets the color reproduction range enlargement ratio (r) at 1. When the average saturation ($S_{ave}$) is in a range of the threshold $Th_1$ to a threshold $Th_2$, the color purity calculator 320 progressively increases the color reproduction range enlargement ratio (r) up to MAX as the average saturation ($S_{ave}$) becomes larger. When the average saturation ($S_{ave}$) exceeds the threshold $Th_2$, the color purity calculator 320 sets the color reproduction range enlargement ratio (r) at MAX.

Figure 11:
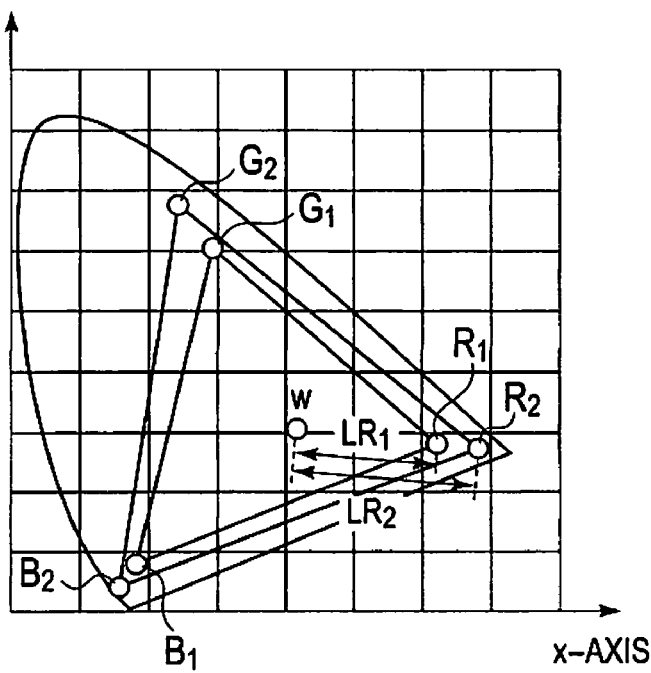
FIG. 11 is another diagram for explaining the example of how the amount of modulation is controlled according to the third embodiment.

Descriptions will be provided for the definition the color reproduction range enlargement ratio (r) by referring to FIG. 11. The color reproduction range enlargement ratio (r) is defined by the x-axis and the y-axis.

An area surrounded by $R_1$, $G_1$, and $B_1$ is a color reproduction range in the light-quantity priority mode. The respective coordinates of $R_1$, $G_1$ and $B_1$ are $(R_{1x}, R_{1y})$, $(G_{1x}, G_{1y})$ and $(B_{1x}, B_{1y})$.

An area surrounded by $R_2$, $G_2$, and $B_2$ is a color reproduction range in the color-purity priority mode. The respective coordinates of $R_1$, $G_1$ and $B_1$ are $(R_{2x}, R_{2y})$, $(G_{2x}, G_{2y})$ and $(B_{2y}, B_{2y})$. Reference symbol W denotes a white point where the color temperature is the lowest. The coordinates of W is $(W_x, W_y)$.

$LR_1$ is the distance between $(R_{1x}, R_{1y})$ and $(W_x, W_y)$. $LR_2$ is the distance between $(R_{2x}, R_{2y})$ and $(W_x, W_y)$. The maximum value MAX of the color reproduction range enlargement ratio Er) is defined as $LR_2/LR_1$. On the other hand, the minimum value MIN of the color reproduction range enlargement ratio (r) is defined as $LR_1/LR_1=1$. As a result, the color reproduction range enlargement ratio (r) is in the range of 1 to MAX.

It should be noted that the maximum value MAX of the color reproduction range enlargement ratio (r) may be defined differently on the basis of the following prerequisite.

$LG_1$: the distance between $(G_{1x}, G_{1y})$ and $(W_x, W_y)$
$LG_2$: the distance between $(G_{2x}, G_{2y})$ and $(W_x, W_y)$
$LB_1$: the distance between $(B_{1x}, B_{1y})$ and $(W_x, W_y)$
$LB_2$: the distance between $(B_{2x}, B_{2y})$ and $(W_x, W_y)$ In this respect, the maximum value of the color reproduction range enlargement ratio (r) may be defined as an average of $LR_2/LR_1$, $LG_2/LG_1$ and $LB_2/LB_1$.

Based on the color reproduction range enlargement ratio (r), the modulation amount controller 340 controls the amounts by which the polarization modulators 40 modulate the polarization directions of the respective modulation-object light beams. As the color reproduction range enlargement ratio (r) comes closer to MAX, the modulation amount controller 340 causes the polarization modulators 40 to modulate the polarization directions of the respective modulation-object light beams more. By contrast, as the color reproduction range enlargement ratio (r) comes closer to 1, the modulation amount controller 340 causes the polarization modulators 40 to modulate the polarization directions of the respective modulation-object light beams less.

In the first example of the modulation amount control, the modulation amount controller 340 uniformly controls the polarization modulator 40R, the polarization modulator 40G and the polarization 40B. In other words, the modulation amount controller 340 uniformly controls the amounts by which the polarization modulator 40R, the polarization modulator 40G and the polarization modulator 40B modulate the polarization directions of the modulation-object light beam Rr, the modulation-object light beam Gr and the modulation-object light beam Br, respectively.

(Second Example of Modulation Amount Control)

Based on the image input signals including the red input signal Rin, the green input signal Gin and the blue input signal Bin, the above-described color purity calculator 320 included in the controller 300 calculates the saturation of the plurality of pixels forming the entire frame in each of the plurality of color ranges.

In this respect, a color range corresponding to the liquid crystal panel 30R is a red range. The red range is a range including the red hue and its neighboring hues. For example, the red range is a range including hues ranging from magenta to yellow.

A color range corresponding to the liquid crystal panel 30G is a green range. The green range is a range including the green hue and its neighboring hues. For example, the green range is a range including hues ranging from yellow to cyan.

A color range corresponding to the liquid crystal panel 30B is a blue range. The blue range is a range including the blue hue and its neighboring hues. For example, the blue range is a range including hues ranging from cyan to magenta.

The saturation of the respective pixels included in the red range will be hereinafter referred to as "red saturation." Similarly, the saturation of the respective pixels included in the green range will be hereinafter referred to as "green saturation," and the saturation of the respective pixels included in the blue range will be hereinafter referred to as "blue saturation."

The color purity calculator 320 calculates an average of the red saturation (hereinafter referred to as an "average red saturation ($SR_{ave}$)). Similarly, the color purity calculator 320 calculates an average of the green saturation (hereinafter referred to as an "average green saturation ($SG_{ave}$)), and an average of the blue saturation (hereinafter referred to as an "average blue saturation ($SB_{ave}$)).

Based on the average red saturation ($S_{ave}$), the color purity calculator 320 determines the color reproduction range enlargement ratio (Rr) for the polarization modulator 40R. Similarly, based on the average green saturation ($SG_{ave}$) and the average blue saturation ($SB_{ave}$), the color purity calculator 320 determines the color reproduction range enlargement ratio (Gr) for the polarization modulator 40G and the color reproduction range enlargement ratio (Br) for the polarization modulator 40B. The color purity calculator 320 notifies the modulation amount controller 340 of the color reproduction range enlargement ratio (Rr), the color reproduction range enlargement ratio (Gr) and the color reproduction range enlargement ratio (Br).

In this respect, the method of determining the color reproduction range enlargement ratio is basically the same as the method described for the first example of modulation amount control (see FIG. 10). Incidentally the determination method may be different among the color reproduction range enlargement ratio (Rr), the color reproduction range enlargement ratio (Gr) and the color reproduction range enlargement ratio (Br).

Based on the color reproduction range enlargement ratio (Rr), the modulation amount controller 340 controls the amount by which the polarization modulator 40R modulates the polarization direction of its modulation-object light beam. Similarly, based on the color reproduction range enlargement ratio (Gr) and the color reproduction range enlargement ratio (Br), the modulation amount controller 340 controls the amounts by which the polarization modulator 40G and the polarization modulator 40B modulate the polarization directions of their modulation-object light beams, respectively. In other words, the modulation amount controller 340 separately controls the amounts by which the polarization modulator 40R, the polarization modulator 40G and the polarization modulator 40B modulate the polarization directions of the modulation-object light beam Rr, the modulation-object light beam Gr and the modulation-object light beam Br, respectively.

(Third Example of Modulation Amount Control)

It should be noted that a third example of modulation amount control is based on the second example of modulation amount control.

Based on the image input signals including the red input signal Rin, the green input signal Gin and the blue input signal Bin, the color purity calculator 320 calculates the hues of the plurality of pixels forming the entire frame in each of the plurality of color ranges.

Subsequently, the color purity calculator 320 determines, for each pixel, adjustment coefficients ($SR_c$) used to adjust the respective saturation of the pixels included in the red range. Needless to say, the adjustment coefficients ($SR_c$) are associated with the pixels included in the red range. Similarly, the color purity calculator 320 determines, for each pixel, adjustment coefficients ($SG_c$) used to adjust the respective saturation of the pixels included in the green range, and adjustment coefficients ($SB_c$) used to adjust the respective saturation of the pixels included in the blue range.

The color purity calculator 320 multiplies the saturation of the pixels included in the red range by the corresponding adjustment coefficients ($SR_c$), and calculates an average of the result of the multiplication as the average red saturation ($SR_{ave}$). Similarly, the color purity calculator 320 multiplies the saturation of the pixels included in the green range respectively by the adjustment coefficients ($SG_c$), and calculates an average of the result of the multiplication as the average green saturation ($SG_{ave}$). Similarly, the color purity calculator 320 multiplies the saturation of the pixels included in the blue range respectively by the adjustment coefficients ($SB_c$), and calculates an average of the result of the multiplication as the average blue saturation ($SB_{ave}$).

Figure 12:
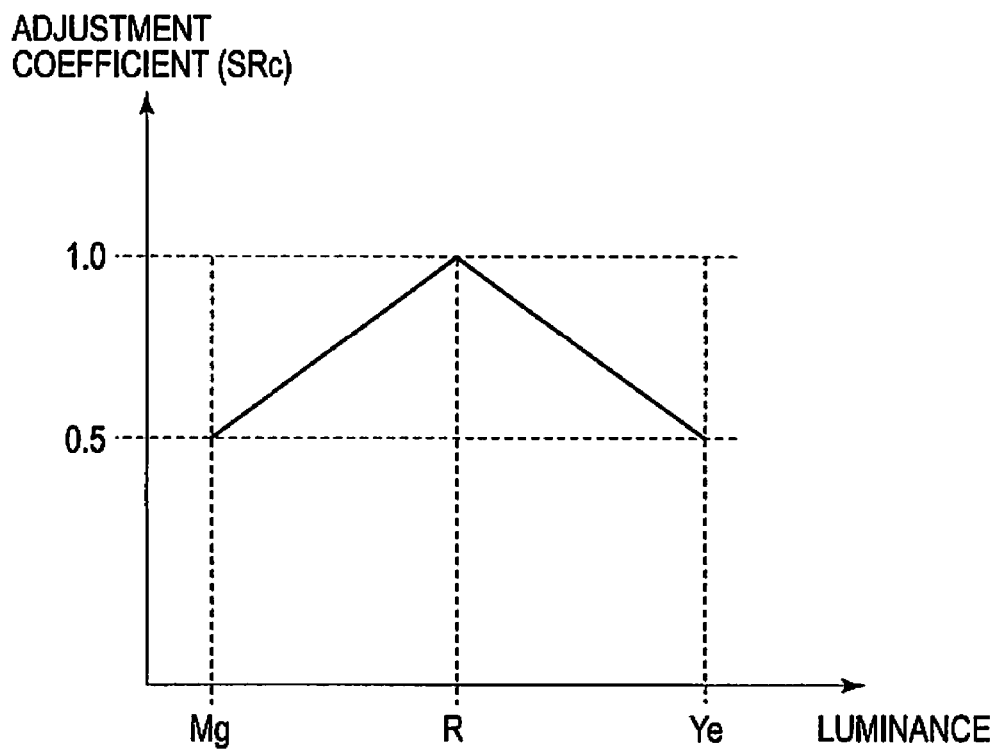
FIG. 12 is yet another diagram or explaining the example of how the amount of modulation is controlled according to the third embodiment.

By taking how to determine an adjustment coefficient ($SR_c$) as an example, descriptions will be provided for the method of determining an adjustment coefficient by referring to FIG. 12. As shown in FIG. 12, an adjustment coefficient ($SR_c$) is in a range 0.5 to 1. As the hue of any one pixel included in the red range becomes closer to the red hue (denoted by R in FIG. 12), the color purity calculator 320 sets the adjustment coefficient ($SR_c$) corresponding to the pixel at a value closer to 1. On the other hand, as the hue of any one pixel included in the red range becomes closer to the magenta hue (denoted by Mg in FIG. 12) or the yellow hue (denoted by Ye in FIG. 12), the color purity calculator 320 sets the adjustment coefficient ($SR_c$) corresponding to the pixel at a value closer to 0.5.

As described above, since the average red saturation ($SR_{ave}$) is calculated based on the saturation adjusted with the corresponding adjustment coefficients ($SR_c$), the color reproduction range enlargement ratio (Rr) increases as the number of pixels included in the red range whose hues are closer to the red hue becomes larger.

The color reproduction range enlargement ratio (Gr) and the color reproduction range enlargement ratio (Br) are determined in the same manner as the color reproduction range enlargement ratio (Rr). Specifically, the color reproduction range enlargement ratio (Gr) increases as the number of pixels included in the green range whose hues are closer to the green hue becomes larger. Similarly, the color reproduction range enlargement ratio (Br) increases as the number of pixels included in the blue range whose hues are closer to the blue hue becomes larger.

(Fourth Example of Modulation Amount Control)

It should be noted that a fourth example of the modulation amount control is based on the first example of the modulation amount control.

Based on the image input signals including the red input signal Rin, the green input signal Gin and the blue input signal Bin, the above-described color purity controller 320 included in the controller 300 calculates the luminances of the plurality of pixels forming the entire frame.

Subsequently, the color purity calculator 320 determines, for each pixel, adjustment coefficients ($S_c$) used to adjust the respective saturation of the pixels forming the entire frame. Needless to say, the adjustment coefficients ($S_c$) are associated with the pixels forming the entire frame.

The color purity calculator 320 multiplies the saturation of the pixels forming the entire frame by the corresponding adjustment coefficients ($S_c$), and calculates an average of the result of the multiplication as the average saturation ($S_{ave}$).

Figure 13:
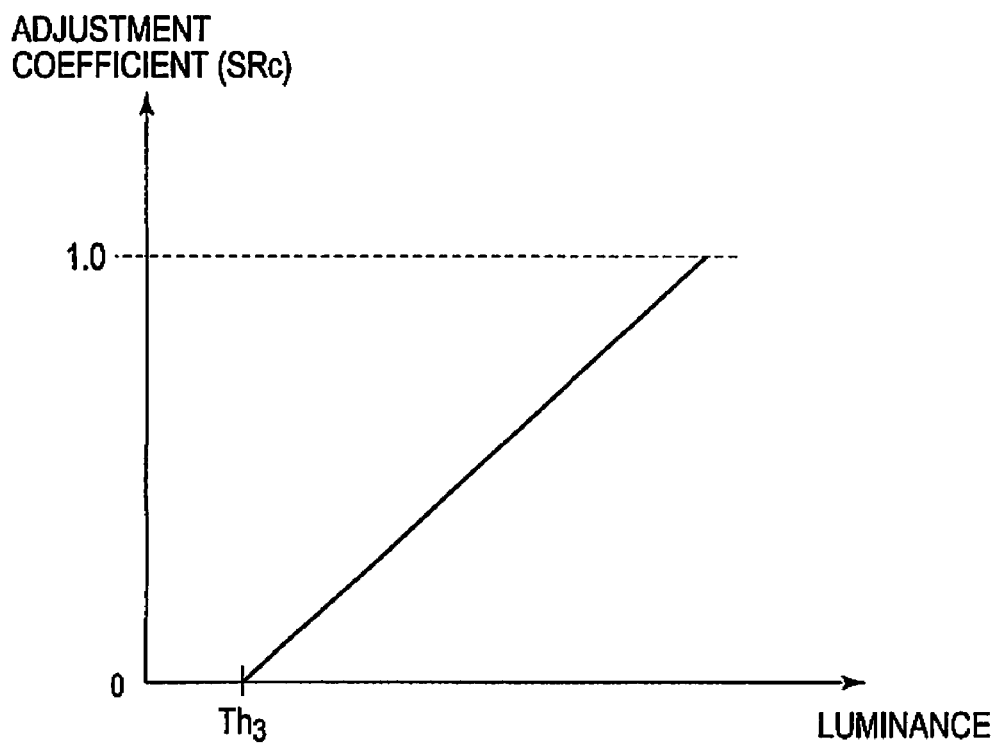
FIG. 13 is the other diagram for explaining the example of how the amount of modulation is controlled according to the third embodiment.

Specifically, as shown in FIG. 13, when the luminance (L) of any one pixel forming the entire frame is in a range of 0 to a threshold $Th_3$, the color purity calculator 320 sets the adjustment coefficient ($S_c$) corresponding to the pixel at 0. When the luminance (L) of any one pixel forming the entire frame exceeds the threshold $Th_3$, the color purity calculator 320 sets the adjustment coefficient ($S_c$) corresponding to the pixel at a value which progressively increases up to 1 as the luminance (L) becomes larger. Incidentally, adjustment coefficient (Sc) is in a range 0 to 1.

As described above, since the average saturation ($S_{ave}$) is calculated based on the saturation adjusted with the corresponding adjustment coefficients ($S_c$), the color reproduction range enlargement ratio (r) increases as the number of pixels whose luminances (L) are higher becomes larger.

(Other Examples of Modulation Amount Control)

The second example of the modulation amount control and the fourth example of the modulation amount control may be combined. Otherwise, the third example of the modulation amount control and the fourth example of the modulation amount control may be combined.

In the first example of the modulation amount control, the color reproduction range enlargement ratio (r) is determined based on the average saturation ($S_{ave}$). However, the control example is not limited to this case. For example, instead of the average saturation ($S_{ave}$), representative values such as the maximum luminance, the minimum luminance and the dispersion value of the plurality of pixels forming the frame may be used.

In the second example of the modulation amount control, the color reproduction range enlargement ratio (Rr), the color reproduction range enlargement ratio (Gr) and the color reproduction range enlargement ratio (Br) are determined based on the average red saturation ($SR_{ave}$), the average green saturation ($SG_{ave}$) and the average blue saturation ($SB_{ave}$), respectively. However, the control example is not limited to this case. Instead of the average red saturation ($SR_{ave}$), the average green saturation ($SG_{ave}$) and the average blue saturation ($SB_{ave}$), representative values such as the maximum luminance, the minimum luminance and the dispersion value of the pixels included in each of the red range, the green range and the blue range may be used.

Fourth Embodiment

Descriptions will be provided for a fourth embodiment by referring to the related drawing. The fourth embodiment will be described focusing chiefly on what makes the fourth embodiment different from the first embodiment.

Specifically, in the fourth embodiment, the polarization modulator 40 is configured of a plurality of areas. The controller 300 controls the amount by which the polarization modulator 40 modulates the polarization direction of the modulation-object light beam for each of the plurality of areas.

Figure 14:
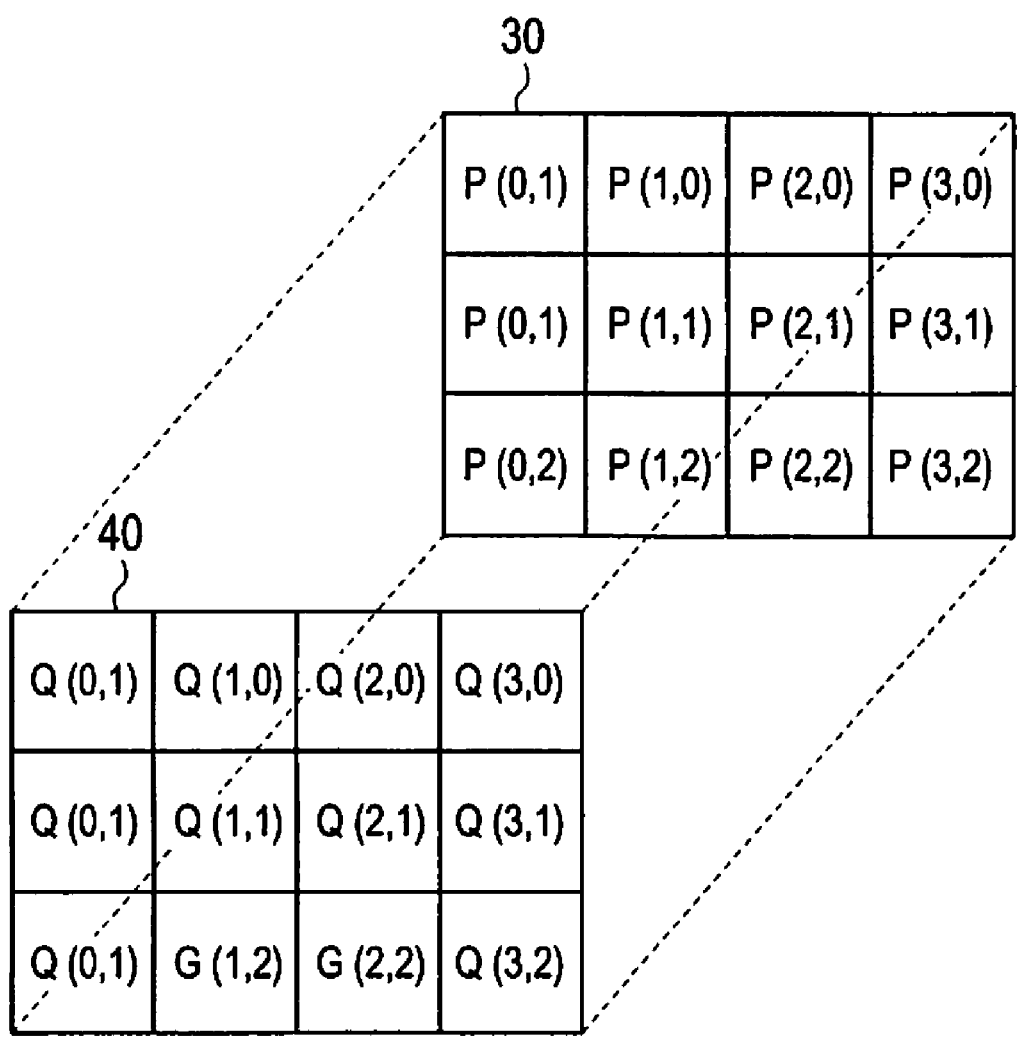
FIG. 14 is a diagram for explaining an example of how an amount of modulation is controlled according to a fourth embodiment.

For example, as shown in FIG. 14, the liquid crystal panel 30 is configured of a plurality of areas. Each area will be denoted by P(x,y) for the purpose of identifying the areas forming the liquid crystal panel 30. Similarly, the polarization modulator 40 is configured of a plurality of areas. Each area will be denoted by Q(x,y) for the purpose of identifying the areas forming the polarization modulator 40.

Based on the image input signals corresponding to an area Q(x,y), the above-described color purity calculator 320 included in the controller 300 calculates the saturation of the plurality of pixels corresponding to the area Q(x,y). In this respect, the image input signals corresponding to the area Q(x,y) is the same as the image input signals corresponding to the area P(x,y).

The color purity calculator 320 calculates an average saturation ($S_{ave}$) for each area Q(x,y). Subsequently, based on the average saturation ($S_{ave}$), the color purity calculator 320 determines the color reproduction range enlargement ratio (r).

The color purity calculator 320 notifies the modulation amount controller 340 of the color reproduction range enlargement ratio (r) determined for each area Q(x,y).

Based on the color reproduction range enlargement ratio (r) determined for each area Q(x,y), the modulation amount controller 340 controls the amount by which the polarization modulator 40 modulates, for each area Q(x,y), the polarization direction of the modulation-object light beam.

The fourth embodiment, that is, the process of controlling the modulation amount for each area Q(x,y), is applicable to any one of the first to fourth examples of the modulation amount control and the other control examples.

Other Embodiments

The present invention has been described by citing the foregoing embodiments as instances. However, the descriptions and drawings forming part of this disclosure shall not be construed as imposing any limitation on the present invention. From this disclosure, various alternative embodiments, examples and operating technologies will be clear to those skilled in the art.

For example, the foregoing embodiments have been described on the presupposition that the polarization modulator 40 has no resolution. However, the present invention is not limited to this case. The polarization modulator 40 may be divided into a plurality of areas and thus configured to be capable of controlling the amount of modulation of the modulation-object light beam for each of the plurality of areas. In other words, the polarization element 40 may have resolution.

In a case where, as described above, the polarization modulator 40 has resolution, it is preferable that the resolution of the polarization modulator 40 should be lower than the resolution of each liquid crystal panel 30. The lower resolution of the polarization modulator 40 makes it possible to suppress decrease in utilization efficiency of each color component light beam, by using electrodes and the like provided to the polarization modulator 40.

It goes without saying that the amount of modulation of the modulation-object light beam which is controlled for each of the plurality of areas is calculated based on the image input signals corresponding to each of the plurality of areas.

As shown in the foregoing embodiment, a user may switch the projection display apparatus between the light-quantity priority mode and the color-purity priority mode. In this case, a mode setting unit through which a user sets up a mode may be provided to the projection display apparatus.

For example, in a case where the user uses the projection display apparatus 100 for data output purpose, the user selects the light-quantity priority mode. In a case where the user uses the projection display apparatus 100 for home theater purpose, the user selects the color-purity priority mode.

The projection display apparatus 100 may be automatically switched between the modes depending on what the projection display apparatus 100 is used for.

Otherwise, the projection display apparatus may be switched between the light-quantity priority mode and the color-quality priority mode depending on the type of input terminal for an image input signal. For example, when the input terminal for an image input signal is the D terminal or the HDMI terminal, it is highly likely that the projecting display apparatus 100 is used for home theater purpose. For this reason, the color-purity priority mode may be automatically selected. On the other hand, when the input terminal used for an image input signal is the DVI terminal or the VGA terminal, it is highly likely that the projection display apparatus is used for data output purpose. For this reason, the light-quantity priority mode may be automatically selected.

Furthermore, the projection display apparatus may be switched between the light-quantity priority mode and the color-quality priority mode depending on the color purity of each of the colors respectively corresponding to the image input signals. Specifically, when the color purity of each color continues to be higher than a predetermined color purity for a specific length of time, the projection display apparatus may be automatically switched to the color-purity priority mode. On the other hand, when the color purity of each color continues to be lower than a predetermined color purity for a specific length of time, the projection display apparatus may be automatically switched to the light-quantity priority mode.

In the first embodiment described above, the polarization modulators 40 are respectively provided on the incident sides of the liquid crystal panels 30. However, the present invention is not limited to this case. Specifically, only one of the plurality of liquid crystal panels 30 may be provided with a polarization modulator 40 on the incident side thereof depending on the specification required for the projection display apparatus 100.

In the second embodiment described above, the polarization modulator 40X is provided in the optical path of the combined light beam including the red component light beam R and the green component light beam G. However, the present invention is not limited to this case. Specifically, the polarization modulator 40X may be provided in the optical path of the combined light beam including the green component light beam G and the blue component light beam B. In this case, the polarization modulator 40X is configured to modulate the polarization direction of a modulation-object light beam (that is, a cyan component light beam) having a wavelength band in a vicinity of the boundary between the green component light beam G and the blue component light beam D.

Although not mentioned in the foregoing embodiments, the projection display apparatus 100 may include an illumination sensor for sensing the intensity of illumination around the projection display apparatus 100. In this case, the modulation amount controller 340 controls the modulation carried out by each polarization modulator 40, depending on the ambient illumination sensed by the illumination sensor. For example, when the ambient illumination sensed by the illumination sensor is higher than a predetermined illumination, the modulation amount controller 340 controls the polarization modulators 40 not to modulate the polarization directions of the corresponding modulation-object light beams (in the light-quantity priority mode). On the other hand, when the ambient illumination sensed by the illumination sensor is lower than a predetermined illumination, the modulation amount controller 340 controls the polarization modulators 40 to modulate the polarization directions of the corresponding modulation-object light beams (in the color-purity priority mode).

Although not mentioned in the foregoing embodiments, the polarization directions of the color component light beams emitted from the light source 10 may be adjusted into the s-polarized light beams or the p-polarized light beams.

Although not mentioned in the foregoing embodiments, the illumination apparatus 120 may use a fourth component light beam (a yellow component light beam Ye or a cyan component light beam Cy) in addition to the red component light beam R, the green component light beam G and the blue component light beam B.

What is claimed is:

1. An illumination apparatus comprising:
    an imager configured to modulate color component light beams emitted from a light source; and
    a polarization modulator provided on a light incident side of the imager, wherein
    the polarization modulator modulates a polarization direction of a modulation-object light beam having a specific wavelength band which is a part of a wavelength band of the color component light beam, without modulating other light beam having another wavelength band other than the specific wavelength band, the other wavelength band being included in the wavelength band of the color component light beam.

2. The illumination apparatus according to claim 1, wherein
    the modulation-object light beam has a wavelength band other than a wavelength band of a high-color-purity component light beam in the color component light beam guided to the imager, the high-color-purity component light beam having the wavelength band which increases the color purity of a monochrome.

3. The illumination apparatus according to claim 1, wherein
    the polarization modulator switches between a state of modulating the polarization direction of the modulation-object light beam by 90° and a state of not modulating the polarization direction of the modulation-object light beam.

4. The illumination apparatus according to claim 1, wherein
    the polarization modulator modulates the polarization direction of the modulation-object light beam in a range of 0° to 90°.

5. The illumination apparatus according to claim 4, further comprising
    a controller configured to control a modulation amount of the polarization direction of the modulation-object light beam modulated by the polarization modulator, depending on image input signals used for modulation amount control of the imager.

6. The illumination apparatus according to claim 5, wherein
    the controller calculates a saturation of each pixel based on the image input signals, and
    the controller controls the modulation amount of the polarization direction of the modulation-object light beam modulated by the polarization modulator, based on the saturation of each pixel.

7. The illumination apparatus according to claim 6, wherein
    the controller calculates an luminance, based on the image input signals, and the controller adjusts the modulation amount of the polarization direction of the modulation-object light beam modulated by the polarization modulator, based on the luminance.

8. The illumination apparatus according to claim 5, further comprising:
- a plurality of imagers as said imager,
- a plurality of polarization modulators respectively corresponding to the plurality of imagers as said polarization modulator, wherein
- the controller calculates saturation in each of a plurality of hue ranges respectively corresponding to the plurality of imagers, based on the image input signals, and
- the controller controls the modulation amounts of the polarization directions of the modulation-object light beams modulated by the plurality of polarization modulators respectively corresponding to the plurality of hue ranges, based on the saturation calculated in each of the plurality of hue ranges.

9. The illumination apparatus according to claim 8, wherein
- the controller calculates a hue in each of a plurality of hue ranges respectively corresponding to the plurality of imagers, based on the image input signals, and
- the controller adjusts the modulation amounts of the polarization directions of the modulation-object light beams modulated by the plurality of polarization modulators respectively corresponding to the plurality of hue ranges, based on the hues calculated in each of the plurality of hue ranges.

10. The illumination apparatus according to claim 5, wherein
- the polarization modulator is configured of a plurality of areas,
- the controller calculates saturation in each of the plurality of areas, based on the image input signals corresponding to each of the plurality of areas, and
- the controller controls the modulation amount of the polarization direction of the modulation-object light beam modulated by the polarization modulator for each of the plurality of areas, based on the saturation calculated in the each of the plurality of areas.

11. The illumination apparatus according to claim 1, wherein
- resolution of the polarization modulator is lower than respective resolutions of the plurality of imagers.

12. The illumination apparatus according to claim 1, wherein the wavelength band of the color component light beam includes a first wavelength band and second wavelength bands, the second wavelength bands are wavelength bands provided on a shorter side of the first wavelength band and a longer side of the first wavelength band,
- the specific wavelength band is one of the first wavelength band or the second wavelength bands, and
- the other wavelength band is another one of the first wavelength band or the second wavelength bands.

13. The projection display apparatus according to claim 1, wherein
- the wavelength band of the color component light beam includes a first wavelength band and second wavelength bands, the second wavelength bands are wavelength bands provided on a shorter side of the first wavelength band and a longer side of the first wavelength band,
- the specific wavelength band is one of the first wavelength band or the second wavelength bands, and
- the other wavelength band is another one of the first wavelength band or the second wavelength bands.

14. A projection display apparatus comprising:
- an imager configured to modulate color component light beams emitted from a light source
- a projection lens unit configured to project the color component light beams modulated by the imager; and
- a polarization modulator provided on a light incident side the imager, wherein
- the polarization modulator modulates a polarization direction of a modulation-object light beam having a specific wavelength band which is a part of a wavelength band of the color component light beam, without modulating other light beam having an other wavelength band other than the specific wavelength band, the other wavelength band being included in the wavelength band of the color component light beam.

* * * * *

UNITED STATES PATENT AND TRADEMARK OFFICE
CERTIFICATE OF CORRECTION

Page 1 of 1

PATENT NO. : 8,123,359 B2
APPLICATION NO. : 12/171420
DATED : February 28, 2012
INVENTOR(S) : Makoto Maeda, Masutaka Inoue and Takaaki Abe It is certified that error appears in the above-identified patent and that said Letters Patent is hereby corrected as shown below:

Title Pg, Item (75) Inventors: should read

-- (75) Inventors: Makoto Maeda, Osaka (JP); Masutaka Inoue, Hirakata (JP); Takaaki Abe, Osaka (JP) --.

Signed and Sealed this
Seventeenth Day of April, 2012

David J. Kappos
*Director of the United States Patent and Trademark Office*